(12) United States Patent
Katashima et al.

(10) Patent No.: US 6,319,595 B1
(45) Date of Patent: Nov. 20, 2001

(54) MAGNETIC TAPE

(75) Inventors: Mitsuhiro Katashima; Manabu Hosoya, both of Tochigi (JP)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/529,930

(22) PCT Filed: Oct. 21, 1998

(86) PCT No.: PCT/JP98/04766

§ 371 Date: Sep. 12, 2000

§ 102(e) Date: Sep. 12, 2000

(87) PCT Pub. No.: WO99/21178

PCT Pub. Date: Apr. 29, 1999

(30) Foreign Application Priority Data

Oct. 21, 1997 (JP) .................................... 9-288973

(51) Int. Cl.$^7$ .................................... G11B 5/718
(52) U.S. Cl. .................... 428/212; 428/328; 428/329; 428/694 BH; 428/694 BA; 428/694 BS; 428/694 BB; 428/694 BM; 360/134
(58) Field of Search ................... 428/212, 328, 428/329, 694 BH, 694 BA, 694 BS, 694 BB, 694 BM, 900; 360/134

(56) References Cited

U.S. PATENT DOCUMENTS

| | | | |
|---|---|---|---|
| 5,262,908 | 11/1993 | Iwamatsu et al. | 360/77.12 |
| 5,518,804 | * 5/1996 | Mizuno et al. | 428/212 |
| 5,705,268 | * 1/1998 | Ishikawa et al. | 428/336 |
| 5,993,948 | * 11/1999 | Yamazaki et al. | 428/212 |
| 6,063,489 | * 5/2000 | Kobayashi et al. | 428/328 |

FOREIGN PATENT DOCUMENTS

| | | |
|---|---|---|
| 57 120230 | 7/1982 | (JP) . |
| 64 70916 | 3/1989 | (JP) . |
| 7 654 34 | 3/1995 | (JP) . |
| 7 220255 | 8/1995 | (JP) . |
| 7 82626 | 9/1995 | (JP) . |
| 9 265626 | 10/1997 | (JP) . |
| WO 99/21178 | 4/1999 | (WO) . |

OTHER PUBLICATIONS

International Search Report.

* cited by examiner

*Primary Examiner*—Stevan A. Resan
(74) *Attorney, Agent, or Firm*—Fish & Richardson

(57) ABSTRACT

Magnetic tape (1) comprising a substrate, a magnetic layer provided on one side of the substrate and a backcoating layer (5) provided on the other side of the substrate, wherein the backcoating layer (5) is a layer capable of magnetic recording on which three or more servo tracks (10a, 10b, 10c) have magnetically been formed in parallel with the longitudinal direction of the tape, and the backcoating layer (5) has a higher coercive force than the coercive force of the whole of all the layers on the magnetic layer side and a lower saturation flux density than the saturation flux density of the whole of all the layers on the magnetic layer side.

7 Claims, 3 Drawing Sheets

MAGNETIC TAPE

TECHNICAL FIELD

The present invention relates to magnetic tape having magnetic servo tracks. More particularly, it relates to magnetic tape having magnetic servo tracks on the side opposite to the magnetic recording side.

BACKGROUND ART

The recent expanding scale of the computer network and the importance of security for data management have been increasing the demand for magnetic tape having an increased recording capacity for use as a medium for data backup. Approaches to high recording capacity are divided into improvement on recording density and extension of the tape length.

Since the tape length that can be put in a tape cartridge as wound is the upper limit of the recording capacity, extension of the tape length for increasing the recording capacity cannot be achieved but by reducing the tape thickness. Therefore, an increase in recording capacity attained by this approach is of necessity limited. With respect to the method of increasing a recording density, it is known that magnetic tape has a lower recording density than a hard disc drive. Serpentine type magnetic tape particularly has a low recording density, which is due to the low track density. On the other hand helical scan type magnetic tape is known to have a higher track density than the serpentine type magnetic tape. This is because the magnetic tape of helical scan type uses a servo tracking system called automatic track finding (ATF).

A servo tracking system has also been adopted to serpentine type magnetic tape to improve the track density. Methods that have been proposed as such a servo tracking system include an embedded servo system, in which servo signals are written on the same track as the data track on the magnetic recording surface, and a system in which a track exclusive to servo signals is provided on the magnetic recording surface. Japanese Patent Publication No. 82626/95 proposes a tracking system particularly useful where the pitch of data tracks is as small as several tens of microns, in which a dedicated track for servo information is provided on the magnetic recording surface and a plurality of servo signal reproduction heads are used to read the servo signals for tracking. According to this technique, however, the number of servo signal reproduction heads must be increased as the number of tracks increases. In order to avoid this, the servo track should be increased. Like this, conventional servo tracking systems use the same side of magnetic tape as used for data recording, which results in reduction of the data recording area. This problem is conspicuous in the servo tracking system of Japanese Patent Publn. No. 82626/95 when a track density is as high as about 30 tpmm (tracks per mm) or even more.

DISCLOSURE OF THE INVENTION

Accordingly, an object of the present invention is to provide magnetic tape which is capable of servo tracking without reducing the data area.

Another object of the present invention is to provide magnetic tape having an increased track density.

Still another object of the present invention is to provide magnetic tape having a high recording capacity.

As a result of extensive investigation, the present inventors found that servo tracking can be carried out without diminishing the data area of a magnetic layer by providing a magnetic servo track on the backcoating layer of magnetic tape, which turned out to give rise to a new problem as to various characteristics of the magnetic tape. As a result of further study, they have found that the various problems associated with a magnetic servo track formed on the backcoating layer can be solved to provide magnetic tape accomplishing the above objects by defining the coercive force and saturation flux density of the backcoating layer to be above a specific value or below a specific value, respectively, in relation to the coercive force and the saturation flux density of the whole of all the layers on the magnetic layer side.

Completed based on the above finding, the present invention has accomplished the above objects by providing magnetic tape comprising a substrate, a magnetic layer provided on one side of the substrate and a backcoating layer provided on the other side of the substrate, wherein the backcoating layer is a layer capable of magnetic recording on which three or more servo tracks have magnetically been formed in parallel with the longitudinal direction of the tape, and the backcoating layer has a higher coercive force than the coercive force of the whole of all the layers on the magnetic layer side and has a lower saturation flux density than the saturation flux density of the whole of all the layers on the magnetic layer side.

BRIEF DESCRIPTION OF THE DRAWINGS

Various other objects, features and attendant advantages of the present invention will be better understood from the following description and the accompanying drawings, in which like reference characters designate like parts and wherein.

BEST MODE FOR CARRYING OUT THE INVENTION

Figure 1:
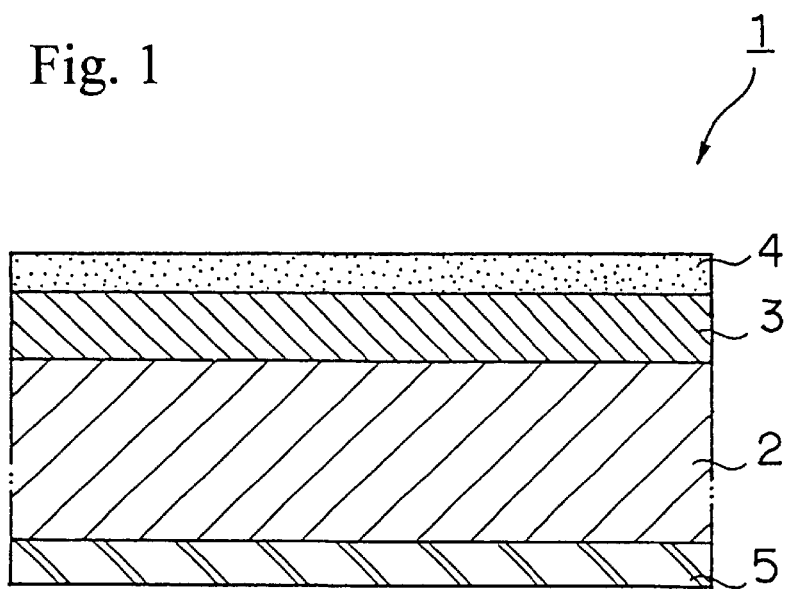
FIG. 1 is a schematic view showing the structure of an embodiment of the magnetic tape according to the present invention.
Figure 2:
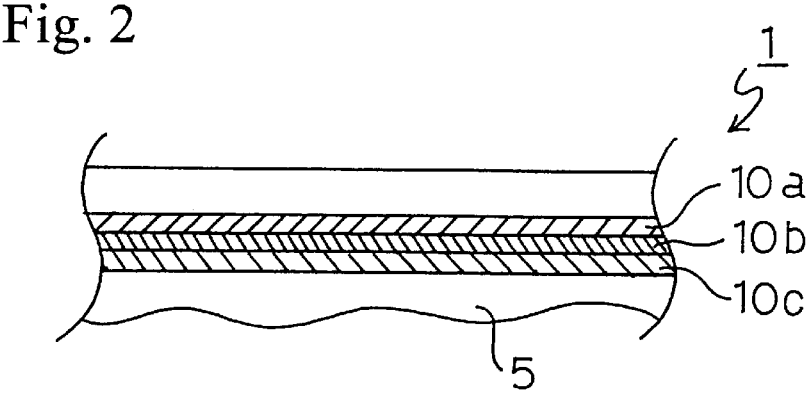
FIG. 2 schematically shows the servo tracks formed on a backcoating layer.
Figure 3:
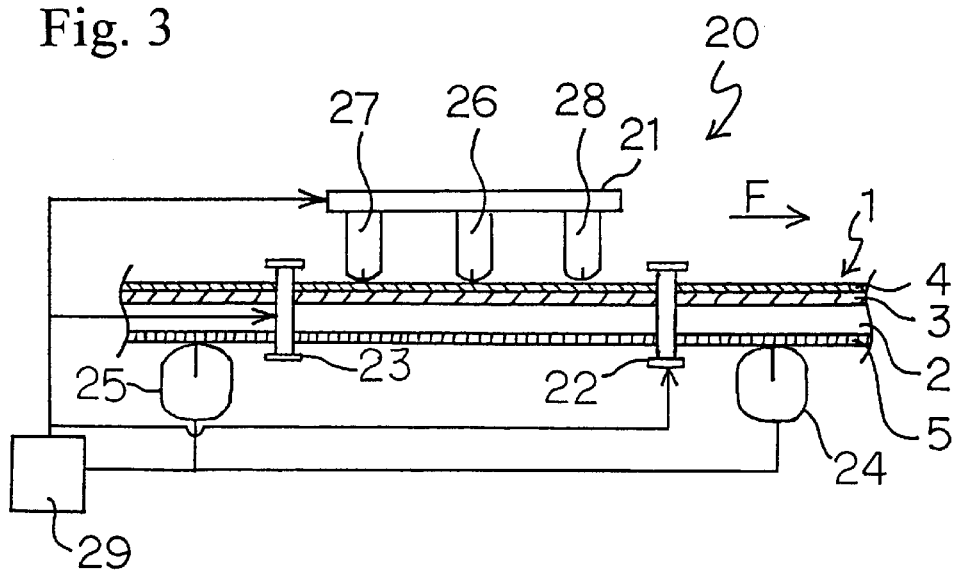
FIG. 3 is a schematic view of a drive used for recording and reproducing the magnetic tape according to the present invention.
Figure 4:
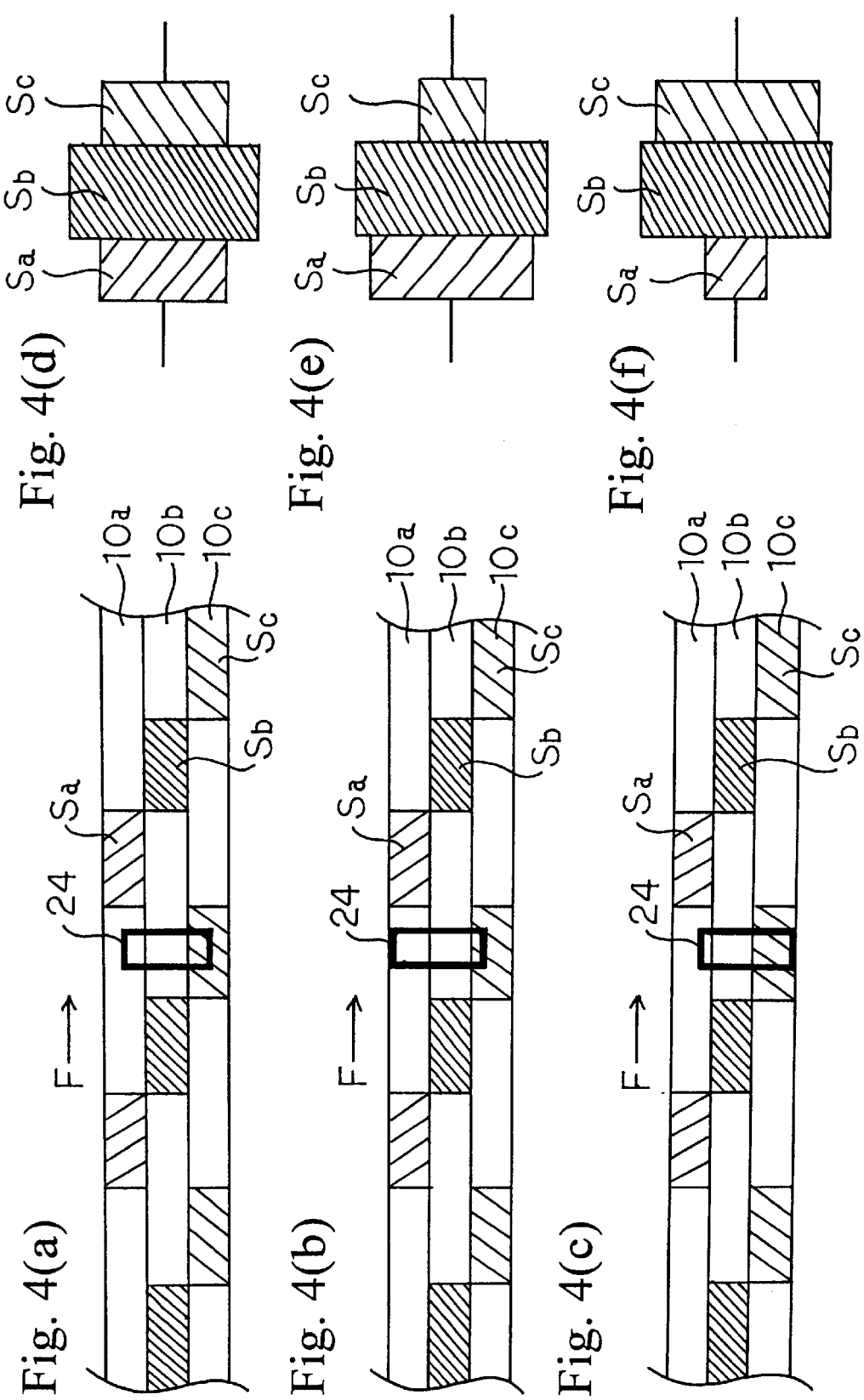
FIGS. 4(a), 4(b), 4(c), 4(d), 4(e), and 4(f) schematically illustrate a method of servo tracking on the magnetic tape according to the present invention.

The magnetic tape of the present invention will be described with reference to the preferred embodiments thereof by referring to the accompanying drawings, in which FIG. 1 is a schematic view showing the structure of an embodiment of the magnetic tape according to the present invention; FIG. 2 schematically shows the servo tracks formed on a backcoating layer; FIG. 3 is a schematic view of a drive used for recording and reproducing the magnetic tape according to the present invention; and FIG. 4 schematically illustrates a method of servo tracking on the magnetic tape according to the present invention.

A magnetic tape 1 of the embodiment shown in FIG. 1 comprises a substrate 2 having provided thereon an intermediate layer 3 and a magnetic layer 4 as a top layer adjoining the intermediate layer 3. The substrate 2 has on the other side a backcoating layer 5.

The magnetic tape 1 shown in FIG. 1 is used for a serpentine recording system. The magnetic layer 4 has a plurality of data tracks in parallel with the running direction of the tape 1. On use, a head unit having a predetermined number of magnetic heads is moved across the magnetic tape 1, switching among data tracks, to record or reproduce data on the data track corresponding to each magnetic head. Servo tracking is carried out so that each magnetic head may be positioned on a right data track on switching among the tracks or during recording or reproduction.

The backcoating layer 5 is a layer formed of magnetic powder dispersed in a binder and is capable of magnetic recording. As shown in FIGS. 2, three servo tracks 10a, 10b, and 10c have previously been formed magnetically on the backcoating layer 5 in parallel with the longitudinal direction (i.e., the running direction) of the tape. Each of these servo tracks is formed over the whole length of the magnetic tape 1. Servo signals have previously been recorded magnetically on these servo tracks, and the recorded servo signals are read to carry out servo tracking on the data tracks of the magnetic layer 4. The servo tracks, each having a width w, have a track pitch w. As stated previously, data tracks of the magnetic layer 4 are also formed in parallel with the longitudinal direction of the magnetic tape 1 similarly to the servo tracks, but the relative positional relationship between the data tracks and the servo tracks is not particularly limited.

Servo tracking based on the reading of the servo signals recorded on the servo tracks 10a, 10b, and 10c will be explained with reference to FIG. 3.

FIG. 3 is a schematic view of a drive 20 which is used for recording and reproducing the magnetic tape 1 shown in FIGS. 1 and 2. The drive 20 has a magnetic head unit 21, a pair of guide rolls 22 and 23, a forward servo signal reading head 24, and a backward servo signal reading head 25. The magnetic head unit 21 is composed of three magnetic heads linearly arranged side by side along the tape running direction. A recording head 26 is in the middle, and a forward reproduction head 27 and a backward reproduction head 28 are on each side thereof. Needless to say, the drive 20 is equipped with, while not shown, other various parts used in ordinary drives for magnetic tape in addition to the above-mentioned parts.

In recording and reproducing the magnetic tape 1 on the drive 20, the side of the magnetic layer 4 is brought into contact with each head of the magnetic head unit 21, while the side of the backcoating layer 5 is brought into contact with each servo signal reading head. When the magnetic tape 1 runs, fore example, forward (in the direction indicated by arrow F), the servo signals recorded on the servo tracks of the backcoating layer 5 are first read by the forward servo signal reading head 24. From the servo signals are furnished the information as to the position on the magnetic tape 1. The positional information is processed by a servo tracking processor 29 fitted to the drive 20 to make a judgement on whether or not the recording head 26 or the forward reproduction head 27 are on the right positions of the data tracks of the magnetic layer 4. The judgement is fed back to the respective drives (not shown) of the magnetic head unit 21 and/or the positioning guide rolls 22 and 23 to carry out servo tracking. As a result, the recording head 26 and the forward reproduction head 27 are positioned on the right data track of the magnetic layer 4 whereby data are recorded by the recording head 26 or the data recorded on that data track is reproduced by the forward reproduction head 27.

The above-described manner of servo tracking is further explained with reference to FIG. 4. As shown in FIGS. 4(a) to 4(c), servo signals Sa, Sb, and Sc have been recorded on the three servo tracks 10a, 10b, and 10c, respectively, at regular intervals. It is preferred that the servo signals Sa, Sb, and Sc have different recording wavelengths. The recording lengths of these signals may be substantially equal. The recording pitch of the servo signals on each servo track is equal to the sum of the recording lengths of the servo signals Sa, Sb, and Sc. The servo signals are recorded in the order of Sc, Sb, and Sa in the forward direction without overlaps.

As shown in FIGS. 4(a) to 4(c), the width of the forward servo signal recording head 24 in its gap is greater than the track width w of each servo track and smaller than three times the track pitch. As a result, the forward servo signal recording head 24 can read simultaneously the servo signals Sa, Sb, and Sc recorded on the three servo tracks 10a, 10b and 10c, respectively.

Going into more details of servo signal reading by referring to FIGS. 4(a) to 4(c), the magnetic tape is running in the forward direction F, and the servo signal Sc recorded on the servo track 10c is the first to be read by the forward servo signal recording head 24. The servo signal Sb recorded on the servo track 10b is then read. As the tape runs further, the servo signal Sa recorded on the servo track 10a is read. The servo signals Sa, Sb and Sc thus read out show output wave forms as shown in FIGS. 4(d) to 4(f). FIGS. 4(d) to 4(f) correspond to the output wave forms in case where the forward servo signal reading head 24 is at the positions shown in FIGS. 4(a) to 4(c), respectively.

The manner of servo tracking will be further illustrated by referring to the output wave forms shown in FIGS. 4(d) to 4(f). FIG. 4(d) is the output wave form with the forward servo signal reading head 24 being at the position shown in FIG. 4(a), in which the output wave forms of the servo signals Sa and Sc are symmetrical about the output wave form of the servo signal Sb. The state giving such wave forms is the state where the forward servo signal reading head 24 is positioned in the middle in the width direction of the three servo tracks 10a, 10b and 10c, i.e., an "on-track" state, which means the recording head 26 and the forward reproducing head 27 are properly positioned on a prescribed data track.

On the other hand, where the output wave form shown in FIGS. 4(e) or 4(f) is obtained, that is, where the output wave forms of the servo signals Sa and Sc are asymmetrical about the output wave form of the servo signal Sb, the forward servo signal reading head 24 is shifted toward either the servo track 10a or 10b as shown in FIG. 4(b) or 4(c). This state is an "off-track" state, indicating that the recording head 26 and the forward reproducing head 27 are not positioned on the proper data track of the magnetic layer. As shown in FIG. 3, the servo tracking processor 29 mounted on the drive 20 gives instructions to the drive (not shown) of the magnetic head unit 21 and/or the positioning guide rolls 22 and 23 so that the recording head 26 and the forward reproducing head 27 may be positioned properly. As a result, the recording head 26 and the forward reproducing head 27 are positioned on the right track by the drive (not shown) to achieve an "on-track" state.

The width w and the pitch p of the servo tracks 10a, 10b and 10c are described by referring to FIG. 2. These tracks are equal in width, each preferably having a width of 10 to 500 $\mu$m, particularly 20 to 100 $\mu$m. If the width w of each servo track is less than 10 $\mu$m, the system (the servo signal reading section and the running system) tends to fail to catch the signals accurately. If it exceeds 500 $\mu$m, the system tends to fail to achieve sufficient tracking accuracy. Therefore, it is preferred for the width to fall within the above range.

As for the pitch p, on the other hand, since there is no gap between adjacent servo tracks, the pitch p is equal to the track width w. However, to make a gap between adjacent serve tracks gives rise to no problem. In such a case, the pitch p is preferably 11 to 600 μm, still preferably 21 to 150 μm.

To secure tracking accuracy, three or more servo tracks are formed on the backcoating layer 5. It is preferred that servo tracking be carried out using three servo tracks as one set in accordance with the above-mentioned tracking system.

Where one or more sets each consisting of three servo tracks are used, the sets of servo tracks may be arranged over the whole width direction of the magnetic tape 1 at prescribed intervals, or the sets of servo tracks may be localized in a part of the width direction of the magnetic tape 10, for example, one or more sets may be arranged in the central portion or either one of side portions of the tape in the width direction at prescribed intervals. Further, the sets spaced at prescribed intervals may be localized in two or more portions of the magnetic tape 10 in the width direction. For example, one or more sets can be arranged on each side portion of the tape (the number of the sets on each portion may be the same or different), one or more sets can be arranged on the central portion and one of the side portions of the tape (the number of the sets on each portion may be the same or different), or one or more sets may be arranged on the central portion and each side portion of the tape (the number of tracks on each portion may be the same or different). In any case, the total number of the sets of the servo tracks is preferably a measure of the number of the data tracks of the magnetic layer 4.

The following problem will arise where the backcoating layer of magnetic tape is made capable of magnetic recording and servo tracks are magnetically formed on the backcoating layer.

Since both the magnetic layer and the backcoating layer possess magnetism, they would interact magnetically to cause magnetic transfer when the magnetic tape is wound. That is, the backcoating layer will be magnetized by the magnetism of the magnetic layer, or the magnetic layer may be magnetized by the magnetism of the backcoating layer. It may follow that both the data signals recorded on the magnetic layer and the servo signals recorded on the backcoating layer have reduced outputs, failing to furnish sufficient reproduction outputs for reliable servo tracking.

According to the present invention, on the contrary, the above problem can be solved by defining the coercive force and saturation flux density of the backcoating layer to be above a specific value or below a specific value, respectively, in relation to the coercive force and the saturation flux density of the whole of all the layers on the magnetic layer side, and thus there is provided magnetic tape capable of servo tracking without suffering from reduction in data area.

Entering into more detail, in the magnetic tape 1 of the present invention, the coercive force of the backcoating layer 5 (hereinafter referred to as Hcb) is set higher than the coercive force of the whole of all the layers on the magnetic layer side (hereinafter referred to as Hcm). If Hcb is equal to or less than Hcm, the backcoating layer 5 would be magnetized by the magnetism of the whole layers on the magnetic layer side when the magnetic tape 1 is wound. As a result, the output of the servo signals recorded on the backcoating layer 5 falls, leading to a failure of reliable servo tracking. Hcb is preferably 110% or more, still preferably 110 to 200%, particularly preferably 120 to 180%, of Hcm. More specifically, Hcb preferably ranges from 90 to 400 kA/m, particularly 120 to 300 kA/m. On the other hand, Hcm is preferably from 80 to 350 kA/m, particularly 100 to 250 kA/m. The language "the coercive force of the whole of all the layers on the magnetic layer side" as used throughout the specification and claims means that the coercive force ascribed to the whole of all the magnetic layers provided on the magnetic layer side". Accordingly, the magnetic tape 1 shown in FIG. 1 taken for instance, where the intermediate layer 3 is a nonmagnetic layer, the "coercive force of the whole of all the layers on the magnetic layer side" denotes the coercive force of the magnetic layer 4. Where the intermediate layer 3 is a magnetic layer, the language means the coercive force of the whole of the magnetic layer 4 and the intermediate layer 3. Measurement is made on magnetic tape only having the magnetic layer 4 and the intermediate layer 3 on the substrate 2 (i.e., magnetic tape having no backcoating layer 5).

As to the saturation flux density of the backcoating layer 5 and the magnetic layer, on the other hand, the saturation flux density of the backcoating layer (hereinafter referred to as Bsb) is set lower than the saturation flux density of the whole of all the layers on the magnetic layer side (hereinafter referred to as Bsm). If Bsb is equal to or higher than Bsm, the magnetic layer 4 will be magnetized by the magnetic flux generated from the servo signals recorded on the backcoating layer 5 when the magnetic tape 1 is wound. As a result, the data signals recorded on the magnetic layer 4 are reduced to cause an increased error rate. It is preferred that Bsb be 90% or less, particularly 10 to 90%, especially 30 to 80%, of Bsm. More specifically, Bsb is preferably 30 to 350 mT, particularly 50 to 200 T, and Bsm is preferably 100 to 400 mT, particularly 120 to 300 mT. The expression "the saturation flux density of the whole of all the layers on the magnetic layer side" as used throughout the specification and claims means the saturation flux density ascribed to the whole of all the magnetic layers provided on the magnetic layer side. Accordingly, the magnetic tape 1 shown in FIG. 1 taken for instance, where the intermediate layer 3 is a nonmagnetic layer, the "saturation flux density of the whole of all the layers on the magnetic layer side" denotes the saturation flux density of the magnetic layer 4. Where the intermediate layer 3 is a magnetic layer, the expression means the saturation flux density of the whole of the magnetic layer 4 and the intermediate layer 3. Similarly to the measurement of coercive force stated above, measurement of saturation flux density is made on magnetic tape only having the magnetic layer 4 and the intermediate layer 3 on the substrate 2 (i.e., magnetic tape having no backcoating layer 5).

One of the methods for providing such a backcoating layer 5 whose coercive force and saturation flux density satisfy the above-described respective relationships to the coercive force and the saturation flux density of the whole of all the layers on the magnetic layer side is a method comprising adjusting the formulation of various components constituting the backcoating layer 5, particularly the kind and amount of magnetic powder. Each component constituting the backcoating layer will be described hereunder.

The backcoating layer 5 comprises magnetic powder and a binder.

The magnetic powder which can be used include those commonly employed in magnetic tape, such as ferromagnetic hexagonal ferrite powder, ferromagnetic metallic powder, and ferromagnetic iron oxide powder. In particular, it is preferred to use ferromagnetic hexagonal ferrite powder.

Having a high coercive force and a low saturation flux density, ferromagnetic hexagonal ferrite powder used as magnetic powder easily provides a backcoating layer 5 whose coercive force and saturation flux density satisfy the relationships with the coercive force and the saturation flux density of the whole of all the layers on the magnetic layer side.

The ferromagnetic hexagonal ferrite powder includes fine tabular magnetic particles of barium ferrite or strontium ferrite, part of the Fe atoms of which may be displaced with Ti, Co, Ni, Zn, V or the like atoms. The ferromagnetic hexagonal ferrite powder preferably has a high coercive force and a low saturation magnetization. Specifically, it preferably has a coercive force (Hc) of 100 to 400 kA/m, particularly 150 to 350 kA/m, and a saturation magnetization ($\sigma$as) of 20 to 100 $Am^2/kg$, particularly 30 to 70 $Am^2/kg$.

The ferromagnetic hexagonal ferrite powder preferably has a small particle size for the purpose of narrowing the magnetic transition range and reducing the surface roughness. Specifically, it preferably has a tabular diameter of 20 to 100 nm, particularly 30 to 70 nm, with an aspect ratio (diameter/thickness) of 1 to 10, particularly 3 to 6, and a BET specific surface area of 30 to 70 $m^2/g$.

Any binders employable in magnetic tape can be combined with the magnetic powder with no restriction. For example, thermoplastic resins, thermosetting resins, reactive resins, and mixtures thereof can be used. Specific examples of useful binders are vinyl chloride copolymers or modified vinyl chloride copolymers, copolymers comprising acrylic acid, methacrylic acid or esters thereof, acrylonitrile copolymers (rubbery resins), polyester resins, polyurethane resins, epoxy resins, cellulosic resins, and polyamide resins. These binders preferably have a number average molecular weight of 2,000 to 200,000. In order to improve dispersing properties for various particles incorporated into the backcoating layer 5, the binder resin can have a polarizing functional group (so-called polar group), such as a hydroxyl group, a carboxyl group or a salt thereof, a sulfo group or a salt thereof, a phosphate group or a salt thereof, a nitro group, a nitric ester group, an acetyl group, a sulfuric ester group or a salt thereof, an epoxy group, a nitrile group, a carbonyl group, an amino group, an alkylamino group, an alkylammonium salt group, a sulfobetaine structure, a carbobetaine structure, and the like. The binder is preferably used in an amount of 10 to 50 parts by weight, particularly 12 to 30 parts by weight, per 100 parts by weight of the magnetic powder.

The backcoating layer 5 can further contain abrasive grains, carbon black, lubricants, hardeners, etc. in addition to the above-described components.

Abrasive grains having a Mohs hardness of 7 or higher, such as alumina, silica, $ZrO_2$, and $Cr_2O_3$, are used for preference. From the standpoint of reduction in frictional coefficient during running and improvement in running durability, the abrasive grains preferably have a primary particle size of 0.03 to 0.6 $\mu$m, particularly 0.05 to 0.3 $\mu$m. The abrasive grains are preferably added in an amount of 2 to 15 parts by weight, particularly 5 to 10 parts by weight, per 100 parts by weight of the magnetic powder.

The carbon black functions as an antistatic agent, a solid lubricant, and the like. While the kind of the carbon black to be used is not particularly limited, it is preferred to use carbon black having a primary particle size of 15 to 80 nm, a BET specific surface area of 10 to 80 $m^2/g$, and a DBP oil absorption of 100 to 300 $cm^3/100$ g because such carbon black makes the surface profile of the backcoating layer 5 satisfactory. To assure the satisfactory surface profile of the backcoating layer 5, the carbon black is preferably added in an amount of 2 to 50 parts by weight, particularly 2 to 10 parts by weight, per 100 parts by weight of the magnetic powder.

The lubricants which can be generally used include fatty acids and fatty acid esters. Examples of the fatty acids are caproic acid, caprylic acid, capric acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid, and octanedicarboxylic acid.

Examples of the fatty acid esters are alkyl esters of the above-enumerated fatty acids, with those having 12 to 36 carbon atoms in total being preferred.

These lubricants are preferably added in an amount of 0.5 to 20 parts by weight, particularly 1 to 10 parts by weight, especially 2 to 8 parts by weight, per 100 parts by weight of the magnetic powder.

The hardeners which are generally used include isocyanate hardeners, exemplified by "Coronate L" (a trade name, produced by Nippon Polyurethane Industry Co., Ltd.) and amine hardeners. The hardeners are preferably added in an amount of 1 to 20 parts by weight, particularly 3 to 10 parts by weight, per 100 parts by weight of the magnetic powder.

The backcoating layer 5 is formed by coating the substrate 2 with a backcoating composition having the above-mentioned components dispersed in a solvent. Examples of the solvent include ketone solvents, ester solvents, ether solvents, aromatic hydrocarbon solvents, and chlorinated hydrocarbon solvents. The solvent is preferably used in an amount of 400 to 2000 parts by weight, particularly 500 to 1500 parts by weight, per 100 parts by weight of the binder.

The thickness of the backcoating layer 5, formed by applying the above-described backcoating composition, is preferably 0.1 to 2 $\mu$m, particularly 0.2 to 1.5 $\mu$m, especially 0.2 to 1.0 $\mu$m, taking into consideration the thickness balance with the magnetic layer 4 and the intermediate layer 3.

With regard to the surface roughness of the backcoating layer, it is preferred for the backcoating layer to have an arithmetic mean roughness Ra of 8 to 30 nm, particularly 10 to 20 nm, and a 10 point mean roughness Rz of 40 to 200 nm, particularly 80 to 150 nm, so as to prevent transfer of the surface profile of the backcoating layer onto the magnetic layer while the magnetic tape 1 is wound and to stabilize the running of the magnetic tape 1. The Ra and Rz of the backcoating layer 5 can be adjusted within these preferred ranges by, for example, incorporating carbon black having the aforementioned physical properties into the backcoating layer 5 in the aforementioned amount.

The arithmetic mean roughness Ra is defined by equation (1) shown below, and the 10 point mean roughness Rz is in accordance with the definition of JIS-B0601-1994. Both parameters can be measured with Laser Interferometric Microscope Maxim 3D Model 5700 manufactured by Zygo under the following conditions.

| | |
|---|---|
| Filter | :Fixed |
| Remove | :Cylinder |
| Filter freg | :4.0 (1/mm) |
| Filter wavelength | :0.250 (mm) |
| Trim | :0 |
| Trim move | :All |
| Lens | :Fizeau ×40 |

In measuring the surface roughness, a sample piece is stuck to a slide glass for microscopes which satisfies the requirements specified in JIS-R-3502 (while, in the present invention, a slide glass produced by Matsunami Glass K.K.

was used, usable slide glass is not limited thereto) with water or ethanol. Existence of excessive water or ethanol will ruin the reproducibility of measurements. Therefore, the results obtained after the water or ethanol evaporates to some extent and while an interference fringe can be seen from the back of the slide glass are taken as Ra and Rz.

$$Ra = \frac{1}{l} \int_0^l |y(x)| dx \quad (1)$$

wherein Y represents profile data; and l represents an assessment length.

Figure 5:
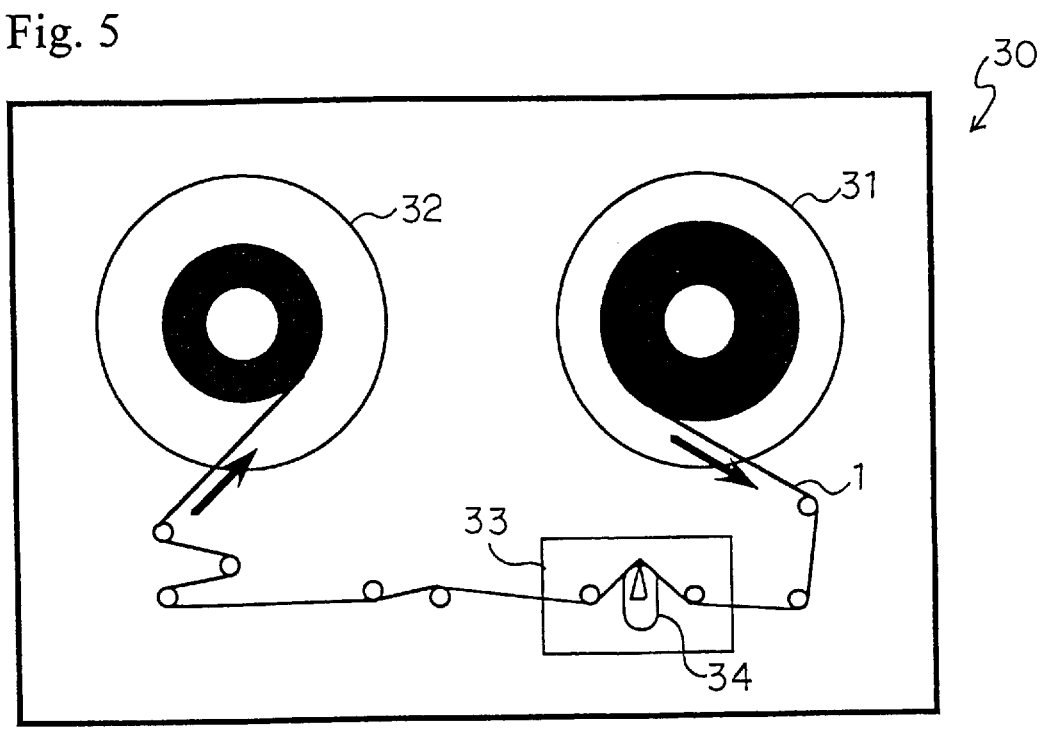
FIG. 5 schematically shows the equipment for recording servo signals on the backcoating layer of magnetic tape.

A method of recording servo signals on the backcoating layer will then be described by referring to FIG. 5. FIG. 5 schematically illustrates the equipment for recording servo signals on the backcoating layer of magnetic tape.

The equipment 30 shown in FIG. 5 has a feed reel 31, a takeup reel 32, and a servo signal recording apparatus 33. The servo signal recording apparatus 33 has a servo signal recording head 34.

The feed reel 31 has a magnetic tape 1, obtained by slitting a magnetic tape stock, wound therearound. The magnetic tape 1 is fed at a predetermined speed. At this time, magnetic recording has not been made on the backcoating layer of the magnetic tape 1. The fed magnetic tape 1 is led in the servo signal recording apparatus 33, where servo signals are recorded on the backcoating layer 5 by means of the servo signal recording head 34 set therein. While FIG. 5 shows only one servo signal recording head 34 for the sake of simplicity, there are actually the same number of recording heads 34 as the number of the servo tracks to be formed on the backcoating layer 5, arranged in the width direction of the magnetic tape 1. In this way prescribed servo signals are recorded on the portions of the backcoating layer 5 in contact with each recording head 34, whereby servo tracks having the recorded servo signals are formed in parallel with the longitudinal direction (i.e., running direction) of the magnetic tape 1 over the whole length of the magnetic tape 1. Finally, the magnetic tape 1 having the servo signals recorded is wound around the takeup reel 32. While not shown, it is preferable that a means for regulating either edge of the running magnetic tape 1 is provided at any position of the magnetic tape running system in the apparatus 33 so that fluctuation of the running tape in the width direction may be prevented thereby to keep the distance from that edge to each servo track constant.

The following is the description on general particulars concerning the magnetic tape according to the present invention.

The magnetic layer 4 of the magnetic tape 1 shown in FIG. 1 is formed by applying a magnetic coating composition comprising ferromagnetic powder and a binder. Namely, the magnetic tape 1 is particulate magnetic tape.

The ferromagnetic powder which can be used include acicular or spindle-shaped ferromagnetic powder and tabular ferromagnetic powder. Acicular or spindle-shaped ferromagnetic powder includes ferromagnetic metal powder mainly comprising iron and ferromagnetic iron oxide powder, and tabular ferromagnetic powder includes ferromagnetic hexagonal ferrite powder. Where, in particular, the backcoating layer 5 contains the above-described ferromagnetic hexagonal ferrite powder, it is preferable to use ferromagnetic powder having a high saturation magnetization in the magnetic layer. Specifically, it is preferred to use acicular or spindle-shaped ferromagnetic metal powder or ferromagnetic iron oxide powder.

The ferromagnetic metal powder includes powder having a metal content of 50% by weight or more, 60% by weight or more of the metal content being Fe. Specific examples of such ferromagnetic metal powders include Fe—Co, Fe—Ni, Fe—Al, Fe—Ni—Al, Fe—Co—Ni, Fe—Ni—Al—Zn, and Fe—Al—Si. The ferromagnetic iron oxide powder includes $\gamma$—$Fe_2O_3$, Co-doped $\gamma$—$Fe_2O_3$, and Co-doped $FeO_x$ ($4/3 \leq x <1.5$). The acicular or spindle-shaped ferromagnetic powder preferably has a major axis length of 0.05 to 0.2 $\mu$m, particularly 0.05 to 0.16 $\mu$m, with an acicular ratio (major axis length/minor axis length) of 3 to 15, particularly 3 to 10.

In using the tabular ferromagnetic hexagonal ferrite powder, the tabular diameter is preferably 0.1 $\mu$m or smaller. In order that the above-mentioned relationships between the backcoating layer 5 and the whole of all the layers on the magnetic layer side in terms of coercive force and saturation flux density are easily satisfied, it is preferred for the acicular or spindle-shaped ferromagnetic powder to have such a coercive force and a saturation magnetization as fall within the following respective ranges. That is, the acicular or spindle-shaped ferromagnetic powder preferably has a coercive force (Hc) of 100 to 400 kA/m, particularly 150 to 350 kA/m, and a saturation magnetization ($\sigma$as) of 100 to 200 $Am^2$/kg, particularly 120 to 170 $Am^2$kg. Further, the BET specific surface area of the acicular or spindle-shaped ferromagnetic powder is preferably 30 to 70 $m^2$/g, particularly 40 to 70 $m^2$/g.

If desired, the ferromagnetic powder can contain rare earth elements or transition metal elements. The ferromagnetic powder can be subjected to a surface treatment to improve dispersibility and the like. The surface treatment can be performed by a method similar to the method described in T. J. Wiseman et al., Characterization of Powder Surfaces, Academic Press (1976), for example, a method comprising coating the surface of the ferromagnetic particles with an inorganic oxide. Inorganic oxides which can be used in this surface treatment include $Al_2O_3$, $SiO_2$, $TiO_2$, $ZrO_2$, $SnO_2$, $Sb_2O_3$, and ZnO. These inorganic oxides can be used either individually or as a mixture of two or more thereof. The surface treatment can also be carried out by an organic treatment, such as a silane coupling treatment, a titanium coupling treatment or an aluminum coupling treatment.

The binder to be used can be of those illustrated for the formation of the backcoating layer 5. While the details of the binder are not described here, the explanations given in relation to the backcoating layer 5 apply appropriately. The binder is preferably used in an amount of 10 to 40 parts by weight, particularly 15 to 25 parts by weight, per 100 parts by weight of the ferromagnetic powder.

The magnetic layer 4 can further contain abrasive grains, carbon black, lubricants, hardeners, etc. in addition to the aforementioned components. These components can be of those which can be used in the backcoating layer 5. While the details of these components are not described here, the explanations given with respect to the backcoating layer 5 apply appropriately. Preferred amounts of these components to be added are shown below, given in terms of parts by weight per 100 parts by weight of the ferromagnetic powder.

| | |
|---|---|
| Abrasive grains | :2 to 20 parts by weight, particularly 5 to 15 parts by weight |
| Carbon black | :0.1 to 10 parts by weight, particularly 0.1 to 5 parts by weight |
| Lubricant | :0.5 to 10 parts by weight, particularly 0.5 to 5 parts by weight |
| Hardener | :1 to 6 parts by weight, particularly 2 to 5 parts by weight |

If desired, the magnetic layer 4 can contain various additives customarily used in magnetic tape, such as dispersants, rust inhibitors, and antifungals, in addition to the above-described components.

The magnetic layer 4 is formed by applying a magnetic coating composition having the aforesaid components dispersed in a solvent on an intermediate layer 3. The solvent can be of those useful in the backcoating composition. The solvent is preferably used in an amount of 80 to 500 parts by weight, particularly 100 to 350 parts by weight, per 100 parts by weight of the ferromagnetic powder present in the magnetic coating composition.

The magnetic coating composition is prepared by, for example, preliminarily mixing the ferromagnetic powder and the binder together with a portion of the solvent in a Naughter mixer, etc., kneading the premixture in a continuous pressure kneader, a twin-screw kneading machine, etc., diluting the mixture with another portion of the solvent, followed by dispersing in a sand mill, etc., adding to the dispersion additives, such as a lubricant, filtering the dispersion, and adding thereto the remainder of the solvent and a hardener.

For obtaining an improved S/N ratio and for preventing self-demagnetization, the thickness of the magnetic layer 4 is preferably 0.1 to 3 $\mu$m, still preferably 0.1 to 2 $\mu$m.

In order that the above-mentioned relationships between the backcoating layer 5 and the whole of all the layers on the magnetic layer side in terms of coercive force and saturation flux density be easily satisfied, it is preferred for the magnetic layer 4 to have such a coercive force and a saturation flux density as fall within the following respective ranges. That is, the magnetic layer 4 preferably has a coercive force (Hc) of 80 to 350 kA/m, particularly 100 to 250 kA/m, and a saturation flux density (Bs) of 100 to 400 mT, particularly 120 to 300 mT.

The intermediate layer 3 is explained below.

The intermediate layer 3 may be either a layer having magnetism or a nonmagnetic layer. Where the intermediate layer 3 is a layer having magnetism, it is a magnetic layer containing magnetic powder, which is formed by using a magnetic coating composition mainly comprising magnetic powder, nonmagnetic powder, a binder, and a solvent. Where, on the other hand, the intermediate layer 3 is a nonmagnetic layer, the intermediate layer 5 is formed by using a nonmagnetic coating composition mainly comprising nonmagnetic powder, a binder, and a solvent. These coating compositions will be inclusively referred to as an intermediate layer coating composition.

The magnetic powder to be used is preferably ferromagnetic powder. Either of hard magnetic powder and soft magnetic powder can be used preferably.

The hard magnetic powder includes the ferromagnetic hexagonal ferrite powder, ferromagnetic metal powder and ferromagnetic iron oxide powder which can be used in the magnetic layer 4. Of these powders, ferromagnetic hexagonal ferrite powder, particularly ferromagnetic hexagonal ferrite powder having a tabular diameter of 0.1 $\mu$m or smaller, is especially preferred. The details of these ferromagnetic powders, while not described here, are the same as the ferromagnetic powders used in the magnetic layer 4, and the explanations given thereto apply appropriately.

While the soft magnetic powder to be used is not particularly limited, magnetic powder generally used in what we call low-current devices, such as a magnetic head and an electron circuit, are preferred. For example, the soft magnetic materials described in Chikazumi Toshinobu, "Kyojiseitai no Buturi (2nd Vol.) Jikitokusei to Ohyo", pp. 368–376, Shokabo (1984) can be used. Specifically, soft magnetic oxide powder and soft magnetic metal powder can be used.

Spinel type ferrite powder is preferably used as the soft magnetic oxide powder. The spinel type ferrite powder includes $MnFe_2O_4$, $Fe_3O_4$, $CoFe_2O_4$, $NiFe_2O_4$, $MgFe_2O_4$, $Li_{0.5}Fe_{2.5}O_4$, Mn—Zn type ferrite, Ni—Zn type ferrite, Ni—Cu type ferrite, Cu—Zn type ferrite, Mg—Zn type ferrite, Li—Zn type ferrite, Zn type ferrite, and Mn type ferrite. These soft magnetic oxide powders may be used either individually or as a combination of two or more thereof.

The soft magnetic metal powder includes Fe—Si alloys, Fe—Al alloys (e.g., Alperm, Alfenol and Alfer), Permalloy (e.g., Ni—Fe binary alloys or multinary alloys composed of the Ni—Fe binary system and Mo, Cu, Cr, etc.), Sendust (Fe—Si(9.6 wt%)-Al(5.4 wt%), and Fe—Co alloys. These soft magnetic metal powders may be used either individually or as a combination of two or more thereof.

The soft magnetic oxide powder usually has a coercive force of 8 to 12000 A/m and a saturation magnetization of 30 to 90 $Am^2$/kg. The soft magnetic metal powder usually has a coercive force of 1.6 to 8000 A/m and a saturation magnetization of 5 to 500 $Am^2$/kg.

While not limiting, the shape of the soft magnetic powders include a spherical shape, a tabular shape, and an acicular shape. The size of the particles is preferably 5 to 800 nm.

If desired, the above-described magnetic powder can contain rare earth elements or transition metal elements similarly to the ferromagnetic powder contained in the magnetic layer 4. Further, the same surface treatment as could be given to the ferromagnetic metal powder may be effected.

The aforementioned nonmagnetic powder is explained. The nonmagnetic powder includes particles of nonmagnetic iron oxide (red oxide), barium sulfate, zinc sulfide, magnesium carbonate, calcium carbonate, calcium oxide, zinc oxide, magnesium oxide, magnesium dioxide, tungsten disulfide, molybdenum disulfide, boron nitride, tin dioxide, silicon carbide, cerium oxide, corundum, artificial diamond, garnet, siliceous stone, silicon nitride, molybdenum carbide, boron carbide, tungsten carbide, titanium carbide, diatomaceous earth, dolomite, and resins. Preferred of them are nonmagnetic iron oxide (red oxide), titanium oxide, and boron nitride. These nonmagnetic powders can be used either individually or as a combination of two or more thereof. The nonmagnetic particles may have any of a spherical shape, a tabular shape, and an acicular shape or may be amorphous. Spherical, tabular, and amorphous particles preferably have a particle size of 5 to 200 nm, and acicular particles preferably have a major axis length of 20 to 300 nm with an acicular ratio of 3 to 20. Where the nonmagnetic powder is used in combination with the magnetic powder (i.e., where the intermediate layer 3 is a magnetic layer), the nonmagnetic powder is preferably used in an amount of 30 to 70 parts by weight, particularly 40 to 60 parts by weight, per 100 parts by weight of the magnetic powder. Where, on the other hand, the magnetic powder is not used (i.e., where the intermediate layer 3 is a nonmagnetic layer), the amounts of the other components are decided based on 100 parts by weight of the nonmagnetic powder. If necessary, the above-mentioned various nonmagnetic powders can be subjected to the same surface treatment as could be done for the magnetic powder.

The intermediate layer 3, either magnetic or nonmagnetic, can contain a binder in addition to the above-mentioned components and may further contain abrasive grains, lubricants, carbon black, hardeners, and the like. While not described specifically, these components are the same as those described with reference to the backcoating layer 5 and magnetic layer 4. Preferred amounts of these components are shown below, given in terms of parts by weight per 100 parts by weight of the total amount of the magnetic powder and the nonmagnetic powder (where the intermediate layer 3 is a magnetic layer) or 100 parts by wight of the nonmagnetic powder (where the intermediate layer 3 is a nonmagnetic layer).

| | |
|---|---|
| Binder | :16 to 40 parts by weight, particularly 20 to 28 parts by weight |
| Abrasive grains | :6 to 30 parts by weight, particularly 8 to 12 parts by weight |
| Lubricant | :2 to 20 parts by weight; particularly 5 to 7 parts by weight |
| Carbon black | :5 to 30 parts by weight, particularly 12 to 20 parts by weight |
| Hardener | :2 to 12 parts, particularly 4 to 8 parts by weight |

If desired, the intermediate layer 3 can contain various additives as could be added to the magnetic layer 4.

The intermediate layer 3 is formed by coating the substrate 2 with an intermediate layer coating composition containing the aforementioned various components and a solvent. The solvent may be of those used in the backcoating composition and the magnetic coating composition. The amount of the solvent to be used is preferably 100 to 700 parts by weight, particularly 300 to 500 parts by weight, per 100 parts by weight of the total of the magnetic powder and the nonmagnetic powder (where the intermediate layer 3 is a magnetic layer) or 100 parts by weight of the nonmagnetic powder (where the intermediate layer 3 is a nonmagnetic layer).

The intermediate layer 3 should have some thickness to control the capacity of holding lubricants which is influential on the durability of the magnetic tape 1, but too large a thickness is liable to cause crack initiation when deflected. Accordingly, a suitable thickness is 0.5 to 10 $\mu$m, particularly 0.1 to 3 $\mu$m.

Where the intermediate layer 3 is a layer having magnetism, its coercive force and saturation flux density preferably fall within the following respective ranges so that the above-mentioned relationships between the backcoating layer 5 and all the layers on the magnetic layer side in terms of coercive force and saturation flux density may be fulfilled with ease. That is, it is preferred for the intermediate layer 3 to have a coercive force (Hc) of 90 to 400 kA/m, particularly 120 to 300 kA/m, and a saturation flux density (Bs) of 30 to 350 mT, particularly 50 to 200 mT.

Materials constituting the substrate 2 are nonmagnetic materials including polymers, such as polyesters, such as polyethylene terephthalate, polybutylene terephthalate, polyethylene naphthalate, polycyclohexylene dimethylene terephthalate, and polyethylene bisphenoxycarboxylate; polyolefins, such as polyethylene and polypropylene; cellulose derivatives, such as cellulose acetate butyrate and cellulose acetate propionate; vinyl resins, such as polyvinyl chloride and polyvinylidene chloride; polyamide; polyimide; polycarbonate; polysulfone; polyether ether ketone; and polyurethane. These materials can be used individually or in combination of two or more thereof. If necessary, the substrate made of these materials can be subjected to uniaxial or biaxial stretching, a corona discharge treatment, a treatment for improving adhesion, and the like.

The thickness of the substrate 2 is not particularly limited. It is preferably 2 to 100 $\mu$m, still preferably 2 to 76 $\mu$m.

The outline of a preferred process for producing the magnetic tape 1 shown in FIG. 1 is described below.

A magnetic coating composition for forming the magnetic layer 4 and an intermediate layer coating composition for forming the intermediate layer 3 are applied simultaneously to the substrate 2 in a wet-on-wet coating system to form coating layers corresponding to the magnetic layer 4 and the intermediate layer 3. That is, the magnetic layer 4 is preferably provided while the intermediate layer 3 is wet.

The coating layers are then subjected to magnetic field orientation, dried, and wound. Thereafter, the coated material is calendered, and a backcoating layer is formed.

Alternatively, formation of the intermediate layer 3 and the magnetic layer 4 may be preceded by formation of the backcoating layer 5. The coated material is aged at 40 to 80° C. for 6 to 100 hours and then slit to a prescribed width. Servo signals are magnetically recorded on the backcoating layer 5 in accordance with the aforementioned method to obtain the magnetic tape 1.

The simultaneous coating technique in a wet-on-wet coating system is described in Japanese Patent Led-Open No. 73993/93, column 42, line 31 to column 43, line 31 This is a technique in which a magnetic coating composition is applied before an intermediate layer coating composition dries. This technique being followed, there is obtained magnetic tape which causes few dropouts and can cope with high-density recording, and the coating layers of the resulting magnetic tape have excellent durability.

The magnetic field orientation treatment is carried out before each coating composition dries. The treatment can be performed by applying a magnetic field of about 40 kA/m or higher, preferably about 80 to 800 kA/m, in parallel with the side coated with the magnetic coating composition or passing the coated material through a solenoid type magnet of about 80 to 800 kA/m while the magnetic coating composition is wet. By the magnetic field orientation treatment under such conditions, the ferromagnetic powder in the magnetic layer 4 are orientated in the longitudinal direction of the magnetic tape 1. For the purpose of inhibiting the thus orientated ferromagnetic powder from changing its orientation during the subsequent drying step, it is a preferred manipulation to apply warm air of 30 to 50° C. from above the magnetic layer 4 immediately before the magnetic field orientation treatment, whereby the coated material is dried preliminarily to have a controlled residual solvent content in each layer.

The drying of the coating layers is carried out by, for example, supplying gas heated to 30 to 120° C. The degree of drying can be controlled by adjusting the temperature and the feed rate of the gas.

The calendering is carried out by, for example, supercalendering comprising passing the coated film between two rolls, such as a combination of a metal roll and a cotton roll or a synthetic resin roll, or a pair of metal rolls. The calendering conditions are preferably, for example, 60 to 140° C. in temperature and 100 to 500 kg/cm in linear pressure.

In the production of the magnetic tape 1, the surface of the magnetic layer 4 can be subjected to a finishing step, such as burnishing or cleaning, according to necessity. It is possible to apply the magnetic coating composition and the intermediate layer coating composition by a generally known successive coating technique.

While the magnetic tape of the present invention has been described based on the preferred embodiments thereof, it should be understood that the present invention is not deemed to be limited thereto, and various changes and modifications can be made therein without departing from the spirit and scope of the present invention.

For example, the signals shown in FIG. 4 may be replaced with other servo signals to be recorded on the servo tracks.

Further, the magnetic tape 1 shown in FIG. 1 may have a primer layer between the substrate 2 and the intermediate layer 3 or the backcoating layer 5.

Furthermore, while the aforementioned embodiments are particulate magnetic tapes, the same effects would be exerted on magnetic tapes of metallizing.

The present invention has been described and will be better understood from the following Examples. However, the Examples are given for illustrative purposes only, and the present invention is not deemed to be limited thereto unless otherwise noted. Unless otherwise specified, all the parts and percents are by weight.

EXAMPLE 1

The following components except the hardener were kneaded in a kneader, dispersed in a stirrer, and further finely dispersed in a sand mill. The dispersion was filtered through a 1 $\mu$m filter, and finally, the hardener was added thereto to prepare a backcoating composition, a magnetic coating composition, and an intermediate layer coating composition having the respective formulations described below.

Formulation of Backcoating Composition:

| | |
|---|---|
| Magnetic powder A (see Tables 1 and 2 as to kind and amount) | |
| Suffoxyl-containing vinyl chloride copolymer (binder) | 20 parts |
| Sulfoxyl-containing polyurethane resin (binder) | 20 parts |
| Alumina (abrasive; primary particle size: 0.18 $\mu$m) | 10 parts |
| Carbon black (primary particle size: 54 nm; BET specific surface area: 32 m$^2$/g; DBP oil absorption: 180 cm$^3$/100 g) | 5 parts |
| Stearic acid (lubricant) | 1 part |
| Butylstearate (lubricant) | 3 parts |
| Methyl ethyl ketone (solvent) | 100 parts |
| Toluene (solvent) | 100 parts |
| Cyclohexanone (solvent) | 100 parts |

Formulation of Magnetic Coating Composition:

| | |
|---|---|
| Ferromagnetic powder a (see Tables 1 and 2 as to kind and amount) | |
| Alumina (abrasive; primary particle size: 0.15 $\mu$m) | 8 parts |
| Carbon black (antistatic; primary particle size: 0.018 $\mu$m) | 0.5 part |
| Vinyl chloride copolymer (binder; average degree of polymerization: 280; epoxy group content: 1.2 wt %; sulfoxyl group content: 8 × 10$^{-5}$ equiv./g) | 10 parts |
| Polyurethane resin (binder; number average molecular weight: 25000; sulfoxyl group content: 1.2 × 10$^{-4}$ equiv./g; glass transition point: 45° C.) | 7 parts |
| Stearic acid (lubricant) | 1.5 parts |
| 2-Ethylhexyl oleate (lubricant) | 2 parts |
| Polyisocyanate (hardener) (Coronate L (trade name, produced by Nippon Polyurethane Industry Co., Ltd.)) | 5 parts |
| Methyl ethyl ketone | 120 parts |
| Toluene | 80 parts |
| Cyclohexanone | 40 parts |

Formulation of Intermediate Layer Coating Composition:

| | |
|---|---|
| Nonmagnetic powder i (see Tables 1 and 2 as for kind and amount) | |
| Magnetic powder I (see Tables 1 and 2 as for kind and amount) | |
| Alumina (abrasive; primary particle size: 0.15 $\mu$m) | 3 parts |
| Vinyl chloride copolymer (binder; average degree of polymerization: 280; epoxy group content: 1.2 wt %; sulfoxyl group content: 8 × 10$^{-5}$ equiv./g) | 12 parts |
| Polyurethane resin (binder; number average molecular weight: 25000; suffoxyl group content: 1.2 × 10$^{-4}$ equiv./g; glass transition point: 45° C.) | 8 parts |
| Stearic acid (lubricant) | 1 part |
| 2-Ethylhexyl oleate (lubricant) | 4 parts |
| Polyisocyanate (hardener) (Coronate L (trade name, produced by Nippon Polyurethane Industry Co., Ltd.)) | 4 parts |
| Methyl ethyl ketone | 90 parts |
| Toluene | 60 parts |
| Cyclohexanone | 30 parts |

The intermediate layer coating composition and the magnetic coating composition were applied simultaneously onto a 4.5 $\mu$m thick polyethylene naphthalate film by means of a die coater to form the respective coating layers having a dry thickness of 1.5 $\mu$m and 0.2 $\mu$m, respectively. The coated film was passed through a solenoid type magnet of 400 kA/m while wet and dried in a drying oven by applying hot air of 80° C. at a rate of 10 m/min. After the drying, the coated film was calendered to form an intermediate layer and a magnetic layer. Subsequently, the reverse side of the substrate was coated with the backcoating composition and dried at 90° C. to form a backcoating layer having a thickness of 0.5 $\mu$m. The resulting magnetic tape stock was slit into 12.7 mm wide tape.

Servo signals were recorded on the backcoating layer of the magnetic tape over the whole length by use of the equipment shown in FIG. 5. The number of tracks was 30. The width of each track was 30 $\mu$m. There was thus obtained a magnetic tape having servo signals recorded on its backcoating layer.

EXAMPLES 2 to 5 and Comparative Examples 1 to 3

A magnetic tape having servo signals recorded on its backcoating layer was obtained in the same manner as in Example 1, except for changing the kinds and amounts of the magnetic powder used in the backcoating composition, the ferromagnetic powder in the magnetic coating composition, and the magnetic powder and the nonmagnetic powder in the intermediate layer coating composition as shown in Tables 1 and 2.

The coercive force and saturation flux density of the backcoating layer, the magnetic layer, and the intermediate layer of the magnetic tapes obtained in Examples and Comparative Examples were measured. The coercive force and saturation flux density of the whole of the magnetic layer and the intermediate layer were also measured. The results obtained are shown in Table 2. Measurement of the coercive force and saturation flux density of each of the backcoating layer, magnetic layer and intermediate layer was carried out on each layer separated by adhesive tape. Measurement on the whole of the magnetic layer and the intermediate layer was made on the magnetic tape from which only the backcoating layer had been removed by using magnetic tape.

To evaluate the performance of the magnetic tapes obtained in Examples and Comparative Examples, the reproduction output of the magnetic tape and the arithmetic mean roughness Ra, 10 point mean roughness Rz, coefficient of dynamic friction, and surface resistivity of the backcoating layer were measured. Further, a tracking test was conducted after the magnetic tape was stored for 3 months in a wound state. The results obtained are shown in Table 2. Of these measurements, the measurements of the arithmetic mean roughness Ra and 10 point mean roughness Rz of the backcoating layer were made in accordance with the above-described methods, and the other measurements were made as follows.

Reproduction Output

Signals having a recording wavelength of 0.6 μm were recorded in accordance with a head tester method. The reproduction output was measured and expressed relatively taking Comparative Example 1 as a standard (0 dB).

Coefficient of Dynamic Friction

A tension (T2) required for making a magnetic tape run at a speed of 14.3 mm/sec in contact with a stainless pole under a tension of 10 g (T1) was measured. The coefficient of dynamic friction ($\mu$) of the magnetic tape was calculated from the measured value according to the following formula:

$$\mu = (1/\pi)\ln(T2/T1)$$

Surface Resistivity

Two electrodes having a radius of 10 mm, plated with 24 K. gold, and finished to have a roughness of N4 (ISO 1302), were horizontally placed in parallel on the magnetic layer at a center-to-center distance d of 12.7 mm. A direct current voltage of 100±10 V was applied to the electrodes while imposing a force of 0.25 N to both ends of the magnetic tape. The current between the electrodes was measured, from which the surface resistivity was obtained.

Tracking Test

Tracking was actually conducted by utilizing the servo signals recorded on the backcoating layer. Variations in output of the signals recorded on the magnetic layer and positional variations of the tape in its width direction were measured to evaluate the tracking performance.

TABLE 1

| | Backcoating Layer | | Magnetic Layer | | Intermediate Layer | | |
|---|---|---|---|---|---|---|---|
| | Magnetic Powder | | Ferromagnetic Powder | | Nonmagnetic Powder | | Magnetic Powder |
| A | Tabular hexagonal barium ferrite | a | Acicular ferromagnetic metal | i | α-$Fe_2O_3$ | I | Tabular hexagonal barium ferrite |
| | Tabular diameter: 0.05 μm | | powder mainly comprising iron | | Major axis: 0.12 μm | | Tabular diameter: 0.05 μm |
| | Aspect ratio: 5 | | Major axis: 0.07 μm | | Acicular ratio: 10 | | Aspect ratio: 5 |
| | Coercive force: 200 kA/m | | Acicular ratio: 6 | | BET specific surface area: 48 $m^2$/g | | Coercive force: 200 kA/m |
| | Saturation magnetization: 50 $Am^2$/kg | | Coercive force 160 kA/m | | | | Saturation magnetization: 50 $Am^2$/kg |
| | BET specific surface area: 50 $m^2$/g | | Saturation magnetization: 142 $Am^2$/kg | | | | BET specific surface area: 50 $m^2$/g |
| | | | BET specific surface area: 56 $m^2$/g | | | | |
| B | Acicular ferromagnetic metal | b | Tabular hexagonal barium ferrite | ii | $TiO_2$ (acicular) | II | Acicular ferromagnetic metal |
| | powder mainly comprising iron | | Tabular diameter: 0.05 μm | | Major axis: 0.25 μm | | powder mainly comprising iron |
| | Major axis: 0.07 μm | | Aspect ratio: 5 | | Acicular ratio: 5 | | Major axis: 0.07 μm |
| | Acicular ratio: 6 | | Coercive force: 200 kA/m | | BET specific surface area: 30 $m^2$/g | | Acicular ratio: 6 |
| | Coercive force: 160 kA/m | | Saturation magnetization: 50 $Am^2$/kg | | | | Coercive force: 160 kA/m |
| | Saturation magnetization: 142 $Am^2$/kg | | BET specific surface area: 50 $m^2$/g | | | | Saturation magnetization: 142 $Am^2$/kg |
| | BET specific surface area: 56 $m^2$/g | | | | | | BET specific surface area: 56 $m^2$/g |
| C | Co-γ-iron oxide | c | Co-γ-iron oxide | iii | $TiO_2$ (spherical) | III | Co-γ-iron oxide |
| | Major axis: 0.15 μm | | Major axis: 0.15 μm | | Particle size: 0.05 μm | | Major axis: 0.15 μm |
| | Acicular ratio: 8 | | Acicular ratio: 8 | | BET specific surface area: 40 $m^2$/g | | Acicular ratio: 8 |
| | Coercive force: 120 kA/m | | Coercive force: 120 kA/m | | | | Coercive force: 120 kA/m |
| | Saturation magnetization: 100 $Am^2$/kg | | Saturation magnetization: 100 $Am^2$/kg | | | | Saturation magnetization: 100 $Am^2$/kg |
| | BET specific surface area: 30 $m^2$/g | | BET specific surface area: 30 $m^2$/g | | | | BET specific surface area: 30 $m^2$/g |

TABLE 2

| | Backcoating Layer | | | | | | | | Magnetic Layer | | | |
|---|---|---|---|---|---|---|---|---|---|---|---|---|
| | Reproduction Output | Coercive Force | Saturation Flux Density | Ra | Rz | Dynamic Friction Coefficient | Surface Resistivity | Magnetic Powder | | Coercive Force | Saturation Flux Density | Ferromagnetic Powder | |
| | (dB)* | (kA/m) | (mT) | (nm) | (nm) | | (Ω/□) | Kind | part | (kA/m) | (mT) | Kind | Part |
| Ex. 1 | +1.1 | 135 | 50 | 15 | 89 | 0.23 | $3.5 \times 10^9$ | A | 100 | 120 | 250 | a | 100 |
| Ex. 2 | +0.8 | 150 | 80 | 13 | 93 | 0.21 | $4.3 \times 10^{10}$ | B | 100 | 138 | 233 | b | 100 |
| Ex. 3 | +1.2 | 148 | 75 | 16 | 100 | 0.18 | $7.8 \times 10^{10}$ | C | 100 | 128 | 195 | c | 100 |

TABLE 2-continued

| | | | | | | | | | | | | | |
|---|---|---|---|---|---|---|---|---|---|---|---|---|---|
| Ex. 4 | +0.9 | 115 | 45 | 12 | 108 | 0.22 | $4.0 \times 10^8$ | A | 75 | 105 | 210 | a | 100 |
| Ex. 5 | +1.4 | 149 | 60 | 15 | 98 | 0.25 | $9.3 \times 10^9$ | A | 120 | 128 | 180 | a | 100 |
| Comp. Ex. 1 | 0 | 85 | 75 | 18 | 93 | 0.23 | $4.0 \times 10^9$ | A | 50 | 120 | 250 | a | 100 |
| Comp. Ex. 2 | −3.1 | 150 | 280 | 16 | 108 | 0.18 | $3.8 \times 10^{10}$ | B | 120 | 120 | 250 | a | 100 |
| Comp. Ex. 3 | −3.5 | 85 | 275 | 13 | 110 | 0.20 | $9.8 \times 10^{10}$ | A | 150 | 120 | 250 | a | 100 |

| | Intermediate Layer | | | | | | Whole on Magnetic Layer Side | | |
|---|---|---|---|---|---|---|---|---|---|
| | Coersive Force | Saturation Flux Density | Magnetic Powder | | Nonmagnetic Powder | | Coersive Force | Saturation Flux Density | Tracking |
| | (kA/m) | (mT) | Kind | Part | Kind | Part | (kA/m) | (mT) | Test |
| Ex. 1 | 105 | 105 | I | 50 | i | 100 | 120 | 250 | OK |
| Ex. 2 | 120 | 75 | II | 50 | ii | 100 | 140 | 180 | OK |
| Ex. 3 | 133 | 50 | III | 50 | iii | 100 | 110 | 200 | OK |
| Ex. 4 | 105 | 45 | I | 50 | i | 100 | 100 | 195 | OK |
| Ex. 5 | 112 | 68 | I | 50 | i | 100 | 120 | 173 | OK |
| Comp. Ex. 1 | 105 | 105 | I | 50 | i | 100 | 120 | 230 | NG |
| Comp. Ex. 2 | 105 | 105 | I | 50 | ii | 100 | 120 | 230 | NG |
| Comp. Ex. 3 | 105 | 105 | I | 50 | iii | 100 | 120 | 230 | NG |

*Comparative Example 1 was taken as a standard (0 dB)

As is apparent from Table 1 and the results shown in Table 2, it is seen that the magnetic tapes of Examples (samples according to the present invention) enable reliable servo tracking without suffering from impairment of the function essential to the backcoating layer. To the contrary, because the comparative magnetic tapes suffered magnetic transfer, they had reduced reproduction outputs and failed in servo tracking.

Industrial Applicability

As described in detail, the present invention provides magnetic tape which is capable of servo tracking without reducing the data area.

The present invention provides magnetic tape which is capable of servo tracking without suffering impairment of the function essential to the backcoating layer.

The present invention provides magnetic tape having an improved track density.

The present invention provides magnetic tape having a high recording capacity.

It is apparent from the above teachings that various modifications can be made in the present. Accordingly, it should be understood that the invention can be practiced otherwise than as specifically described within the scope of what is claimed attached hereto.

What is claimed is:

1. Magnetic tape comprising a substrate, a magnetic layer provided on one side of said substrate and a backcoating layer provided on the other side of said substrate, wherein:

said backcoating layer is a layer capable of magnetic recording on which three or more servo tracks have magnetically been formed in parallel with the longitudinal direction of the tape; and said backcoating layer has a higher coercive force than the coercive force of the whole of all the layers on the magnetic layer side and has a lower saturation flux density than the saturation flux density of the whole of all the layers on the magnetic layer side.

2. Magnetic tape as claimed in claim 1, wherein the coercive force of said backcoating layer is 110% or more of the coercive force of the whole of all the layers on the magnetic layer side, and the saturation flux density of said backcoating layer is 90% or less of the saturation flux density of the whole of all the layers on the magnetic layer side.

3. Magnetic tape as claimed in claim 1, wherein the coercive force of said backcoating layer is 90 to 400 kA/m, and the coercive force of the whole of all the layers on the magnetic layer side is 80 to 350 kA/m.

4. Magnetic tape as claimed in claim 1, wherein the saturation flux density of said backcoating layer is 30 to 350 mT, and the saturation flux density of the whole of all the layers on the magnetic layer side is 100 to 400 mT.

5. Magnetic tape as claimed in claim 1, wherein said backcoating layer comprises magnetic powder, a binder and carbon black, said binder is present in an amount of 10 to 50 parts by weight per 100 parts by weight of said magnetic powder, and said carbon black is present in an amount of 2 to 50 parts by weight per 100 parts by weight of said magnetic powder.

6. Magnetic tape as claimed in claim 5, wherein said magnetic powder comprises tabular ferromagnetic hexagonal ferrite powder having a tabular diameter of 20 to 100 nm.

7. Magnetic tape as claimed in claim 1, wherein one or more magnetic or nonmagnetic intermediate layers are provided between said substrate and said magnetic layer, and said magnetic layer comprises acicular or spindle-shaped ferromagnetic metal powder having a major axis length of 0.05 to 0.2 μm or tabular ferromagnetic hexagonal ferrite powder having a tabular diameter of 0.1 μm or smaller.

* * * * *